US008646031B2

(12) United States Patent
Gronich et al.

(10) Patent No.: US 8,646,031 B2
(45) Date of Patent: Feb. 4, 2014

(54) METHOD OF GENERATING SECURITY RULE-SET AND SYSTEM THEREOF

(75) Inventors: Yoram Gronich, Haifa (IL); Haggai Schechtman, Tel-Aviv (IL); Yoni Lavi, Ra'anana (IL)

(73) Assignee: Tufin Software Technologies Ltd, Ramat Gan (IL)

( * ) Notice: Subject to any disclaimer, the term of this patent is extended or adjusted under 35 U.S.C. 154(b) by 3 days.

(21) Appl. No.: 13/326,517

(22) Filed: Dec. 15, 2011

(65) Prior Publication Data

US 2012/0180104 A1 Jul. 12, 2012

Related U.S. Application Data

(60) Provisional application No. 61/423,654, filed on Dec. 16, 2010.

(51) Int. Cl.
*G06F 17/00* (2006.01)
(52) U.S. Cl.
USPC ............................................................ 726/1
(58) Field of Classification Search
USPC .................... 726/1, 11, 12, 22; 709/223–224
See application file for complete search history.

(56) References Cited

U.S. PATENT DOCUMENTS

| 6,182,226 | B1 | 1/2001 | Reid et al. |
| 7,032,022 | B1 | 4/2006 | Shanumgam et al. |
| 7,225,255 | B2 | 5/2007 | Favier et al. |
| 8,156,553 | B1 * | 4/2012 | Church et al. ................... 726/22 |
| 2006/0031472 | A1 | 2/2006 | Rajavelu et al. |
| 2006/0259955 | A1 | 11/2006 | Gunther et al. |
| 2007/0282981 | A1 * | 12/2007 | Cohen et al. ................... 709/221 |

* cited by examiner

*Primary Examiner* — Brandon Hoffman
*Assistant Examiner* — Anthony Brown
(74) *Attorney, Agent, or Firm* — Browdy and Neimark, PLLC

(57) ABSTRACT

There are provided a method of automated generation of a security rule-set and a system thereof. The method comprises: obtaining a group of log records of communication events resulting from traffic related to the security gateway; generating a preliminary rule-set of permissive rules, said set covering the obtained group of log records; generating, with the help of mapping the generated preliminary rule-set to the obtained group of log records, a rule-set of non-overlapping rules covering the group of log records; and generating an operational rule-set by processing the generated rule-set of non-overlapping rules, said processing including mapping the generated rule-set of non-overlapping rule to the obtained group of log records.

18 Claims, 12 Drawing Sheets

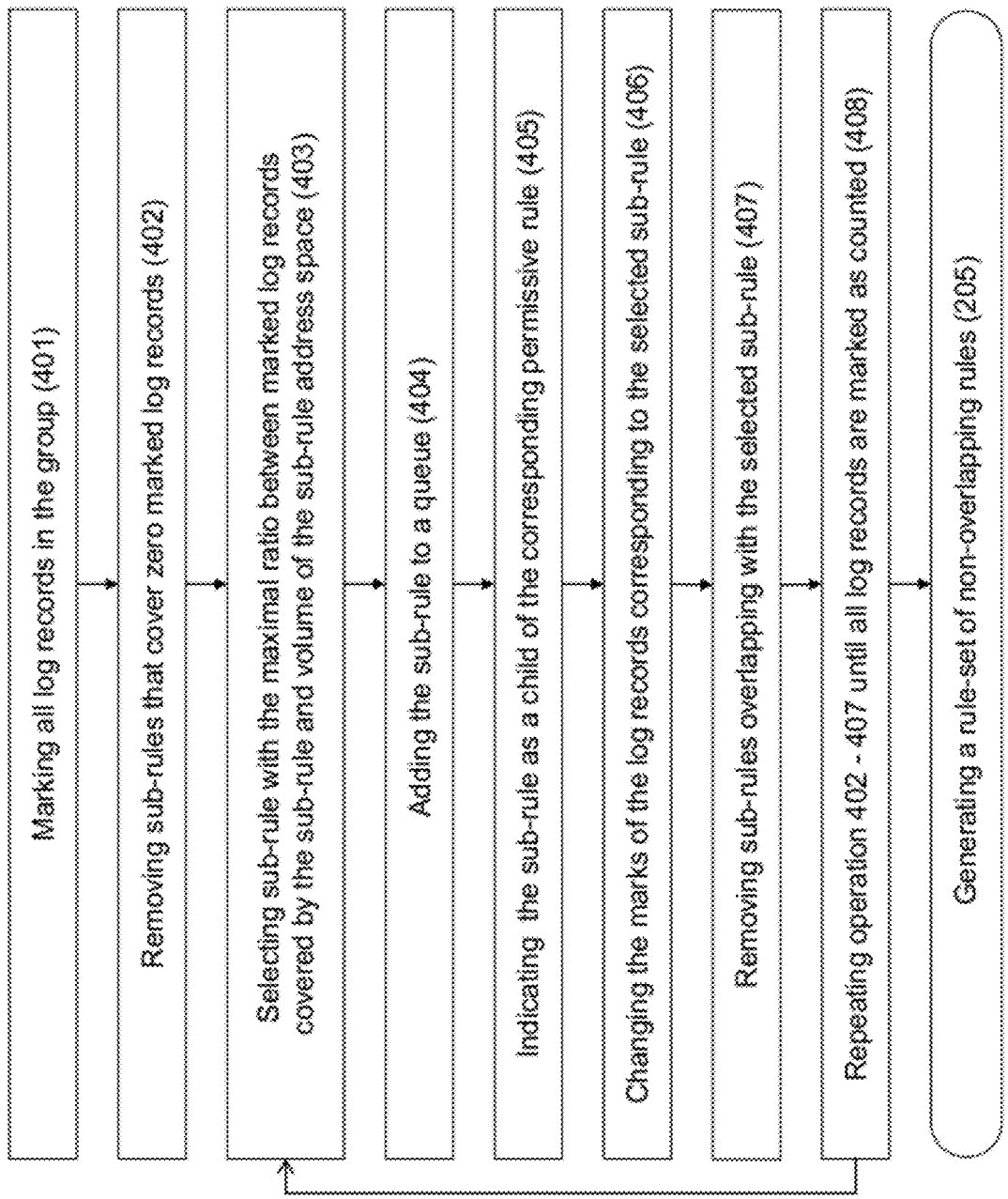

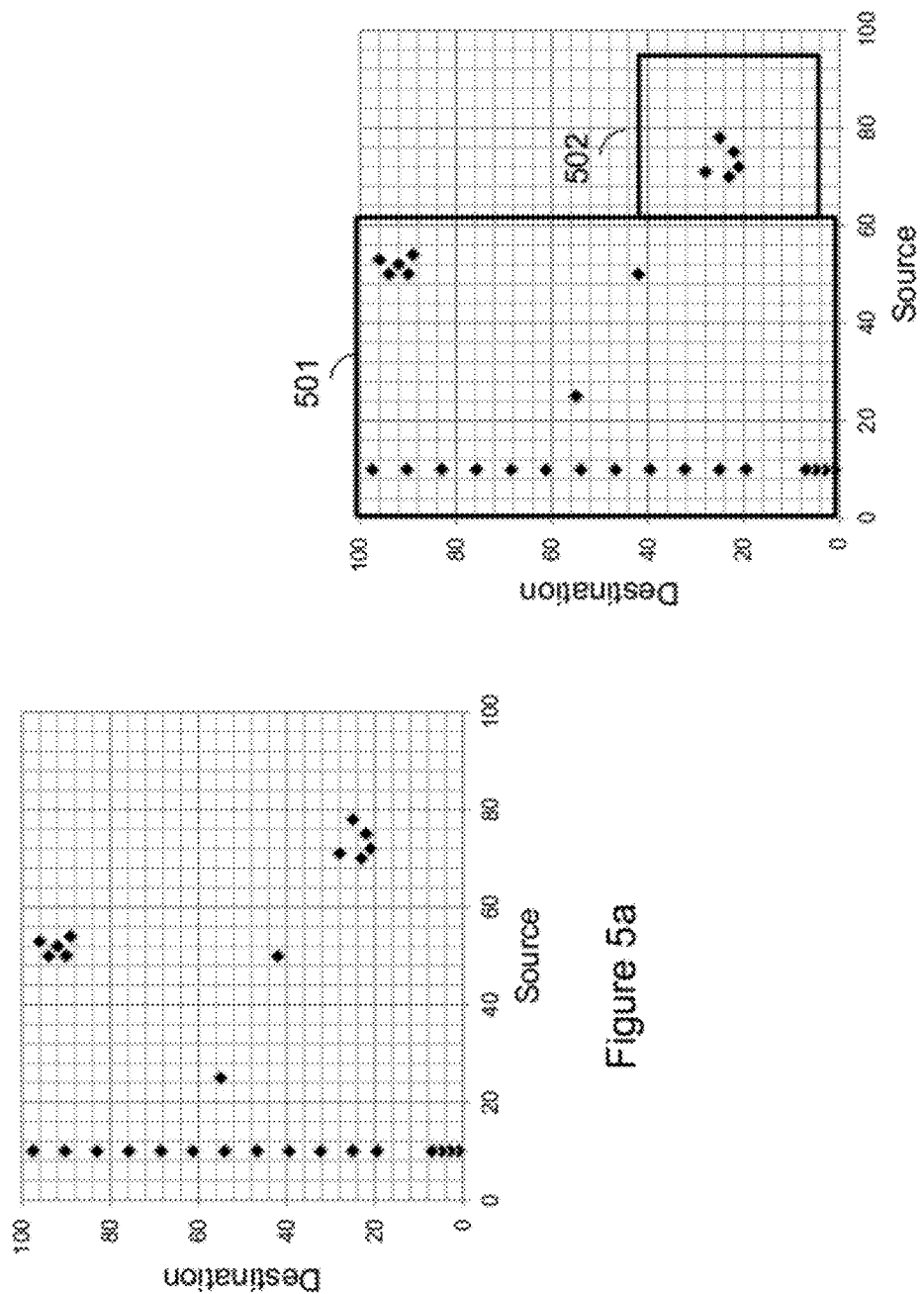

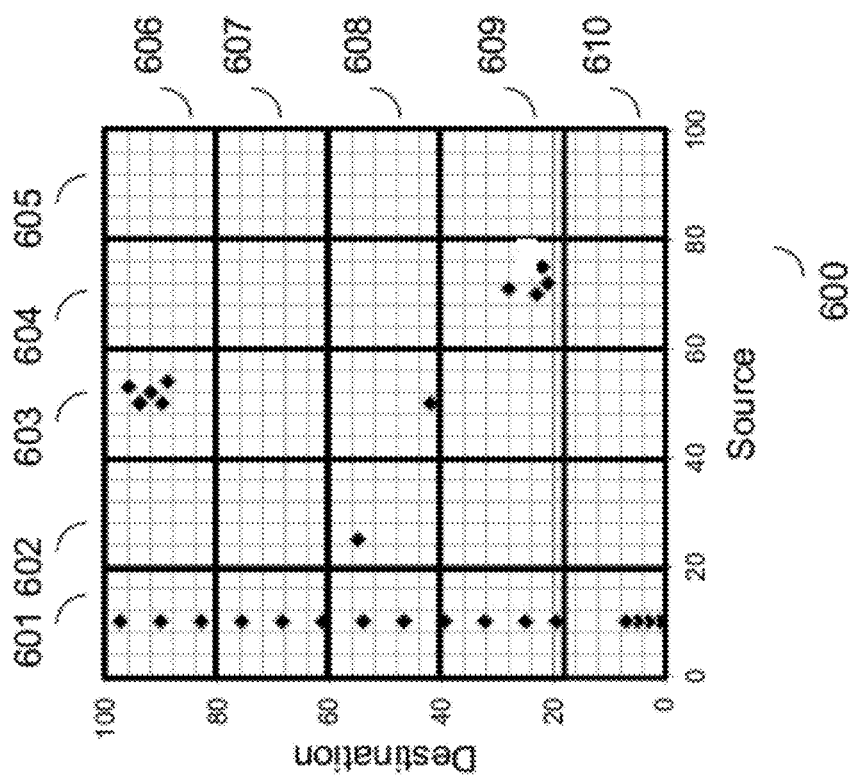

METHOD OF GENERATING SECURITY RULE-SET AND SYSTEM THEREOF

CROSS-REFERENCES TO RELATED APPLICATIONS

This application claims priority from U.S. Provisional Patent Application No. 61/423,654 filed on Dec. 16, 2010, incorporated herein by reference in its entirety.

FIELD OF THE INVENTION

This invention generally relates to network security, and more particularly, to security gateways and methods of operating thereof.

BACKGROUND OF THE INVENTION

Today, information security is one of the critical concerns in computer networks and services. Various methods have been developed for protection of various resources and services; usually these methods include implementation of one or more security policies, combinations and hierarchies thereof. Typically, a security policy includes control of inbound and outbound traffic related to certain resources. Such control is enforced with the help of a security gateway, which can comprise various devices and/or combinations thereof (e.g. switches, routers, firewalls, VPN devices, load balancers, etc.).

However, configuring the security gateway, especially in complex network architecture, presents an increasing challenge to security departments worldwide. The problem has been recognized in the Prior Art and various systems have been developed to provide a solution, for example:

U.S. Pat. No. 6,182,226 (Reid et al.) entitled "System and method for controlling interactions between networks" discloses a firewall used to achieve network separation within a computing system having a plurality of network interfaces. A plurality of regions is defined within the firewall and a set of policies is configured for each of the plurality of regions. The firewall restricts communication to and from each of the plurality of network interfaces in accordance with the set of policies configured for the one of the plurality of regions to which the one of the plurality of network interfaces has been assigned.

U.S. Pat. No. 7,032,022 (Shanumgam et al.) entitled "Statistics aggregation for policy-based network" discloses a unified policy management system for an organization including a central policy server and remotely situated policy enforcers. A central database and policy enforcer databases storing policy settings are configured as LDAP databases adhering to a hierarchical object oriented structure. Changes in the policy settings made at the central policy server are automatically transferred to the policy enforcers for updating their respective databases. Each policy enforcer collects and transmits health and status information in a predefined log format and transmits it to the policy server for efficient monitoring by the policy server. The system also provides for dynamically routed VPNs where VPN membership lists are automatically created and shared with the member policy enforcers. Updates to such membership lists are also automatically transferred to remote VPN clients. The system further provides for fine grain access control of the traffic in the VPN by allowing definition of firewall rules within the VPN.

U.S. Pat. No. 7,225,255 (Favier et al.) entitled "Method and system for controlling access to network resources using resource groups" encloses a method and device for configuring a firewall in a computer system employing a rule for controlling access between a source resource and a destination resource only if said source and destination resources belong to the same protection domain. At a central configuration machine, an access control rule is specified, including a scope, for each resource group, the scope, and thus the access control rule is capable of being interpreted by each of the plurality of firewalls differently depending on the value of the scope and network resource characteristics associated with each of the plurality of firewalls.

US Patent Application No. 2006/259,955 (Gunther et al.) entitled "Attribute-based allocation of resources to security domains" discloses a method for the optimized assignment of access rights to IT resources managed by means of a security management system and to a correspondingly adapted security management system. According to the invention a security domain is defined on the basis of at least one attribute of IT resources and a plurality of authorization profiles is provided for the security domain. User groups are assigned to the domain and linked to profiles provided for the domain. IT resources for which the security management is responsible are allocated to the domain in accordance with the attribute defining the security domain, as a result of which user groups assigned to the domain receive access rights to the IT resources allocated to the domain in accordance with the profiles linked to them. The invention permits the user groups to be issued with authorizations that are tailored to the requirements of the individual groups.

US Patent Application No. 2006/248,580 (Fulp et al.) entitled "Methods, systems, and computer program products for network firewall policy optimization" discloses a method and system for firewall policy optimization. According to one method, a firewall policy including an ordered list of firewall rules is defined. For each rule, a probability indicating a likelihood of receiving a packet matching the rule is determined The rules are sorted in order of non-increasing probability in a manner that preserves the firewall policy.

US Patent Application No. 2006/031,472 (Rajavelu et al.) entitled "Network data analysis and characterization model for implementation of secure enclaves within large corporate networks" discloses a database storing information about known hosts, the applications or services they host, and the ports (known as confirmed ports) used by the applications/services. A static traffic analyzer analyzes traffic data and identifies packets communicating with (either sent to or received from) confirmed ports on hosts. A dynamic traffic analyzer analyzes the traffic data and identifies packets communicating with unconfirmed ports on hosts. A host identifier uses the resulting static and dynamic traffic to identify hosts for which firewall rules should be generated.

SUMMARY OF THE INVENTION

Typically, the process of configuring a security gateway includes a process of manual configuration of the rule-set and requires a prior knowledge of IT resources and connectivity requirements. There is a need in the art to provide a new system and method facilitating an automated creation of an operational rule-set.

In accordance with certain aspects of the presently disclosed subject matter, there is provided a method of automated generation of a security rule-set for use with a security gateway. The method comprises: obtaining a group of log records of communication events resulting from traffic related to the security gateway; generating a preliminary rule-set of permissive rules, said set covering the obtained group of log records; generating, with the help of mapping the generated preliminary rule-set to the obtained group of log records, a rule-set of non-overlapping rules covering the group of log records; and generating an operational rule-set by processing the generated rule-set of non-overlapping rules, said processing including mapping the generated rule-set of non-overlapping rule to the obtained group of log records.

The obtained group of log records can comprise amount of log records matching a predefined threshold (e.g. related to number of records and/or type of events and/or collection period, etc.). The obtained group of log records can comprise all log records collected during a substantial collection period, log records selected among collected log records, wherein the selection is provided in accordance with values specified in at least one field of the collected log records, etc.

Traffic related to the security gateway can comprise traffic controlled by the security gateway and/or traffic between source and destination addresses to be controlled by the security gateway.

In accordance with further aspects of the presently disclosed subject matter, generating the operational rule-set can comprise recursive dividing the rules in respective preliminary rule-set and generating a respective rule-set of non-overlapping rules until the generated rule-set of non-overlapping rules matches a predefined criterion.

In accordance with further aspects of the presently disclosed subject matter, generating the preliminary rule-set can comprise defining an address space covering the group of obtained log records and generating 2R permissive rules, wherein each of R non-overlapping equal-size rules controls respective part of traffic resulting from dividing the destination range characterizing said defined address space into R parts whilst maintaining the source range of said address space, and wherein each of other R non-overlapping rules controls a respective part of traffic resulting from dividing the source range of said defined address space into R parts whilst maintaining the destination range of said address space, and wherein R is natural number R>1.

In accordance with further aspects of the presently disclosed subject matter, the method can further comprise generating a tree structure representing at a respective level each of the recursive-generated rule-sets of non-overlapping rules. The method can further comprise traversing the generated tree structure in order to generate the operational rule-set matching a predefined criterion selected from a group comprising criteria related, at least, to extra coverage and criteria related, at least, to a number of rules in the operational rule set.

By way of non-limiting example, generating the rule-set of non-overlapping rules can comprise: a) marking by a certain mark all log records in the obtained group;
b) selecting in preliminary rule-set a rule with the maximal ratio between number of covered log records marked by said certain mark and the volume of the address space of the respective rule; c) adding the selected rule to the rule-set of non-overlapping rules;
d) removing said certain mark from the log records covered by said rule; e) removing from preliminary rule-set all rules overlapping with the selected rule; and f) repeating steps b)-e) until removing said certain mark from all log records in the obtained group.

By way of non-limiting example, generating the rule-set of non-overlapping rules can comprise: a) marking by a certain mark all log records in the obtained group;
b) selecting in preliminary rule-set a rule with the maximal ratio between number of covered log records marked by said certain mark and the volume of the address space of the respective rule; c) adding the selected rule to the rule-set of non-overlapping rules;
d) removing said certain mark from the log records covered by said rule; e) generating a new preliminary rule-set covering remained log records marked by the certain mark and characterized by address space non-overlapping with the address space of the selected rule; and f) repeating steps b)-e) until removing said certain mark from all log records in the obtained group.

In accordance with other aspects of the presently disclosed subject matter, there is provided a system capable of automated generation of a security rule-set. The system comprises an interface operable to obtain a group of log records of communication events resulting from traffic related to the security gateway and a processor operatively coupled to the interface. The processor is operable to: generate a preliminary rule-set of permissive rules, said set covering the obtained group of log records; generate, with the help of mapping the generated preliminary rule-set to the obtained group of log records, a rule-set of non-overlapping rules covering the group of log records; and generate an operational rule-set by processing the generated rule-set of non-overlapping rules, said processing including mapping the generated rule-set of non-overlapping rule to the obtained group of log records.

The processor can be further operable to generate a tree structure representing at a respective level each of the recursive-generated rule-sets of non-overlapping rules. The processor can be further operable to traverse the generated tree structure in order to generate the operational rule-set matching a predefined criterion selected from a group comprising criteria related, at least, to extra coverage and criteria related, at least, to a number of rules in the operational rule set.

Among advantages of certain aspects of the presently disclosed subject matter is decreasing human involvement in the process of initial and on-going configuration of the security gateway, thus enabling substantial error and cost reduction even for large and complex networks.

BRIEF DESCRIPTION OF THE DRAWINGS

In order to understand the invention and to see how it can be carried out in practice, an embodiment will now be described, by way of non-limiting example only, with reference to the accompanying drawings, in which:

FIG. 4a illustrates a generalized flow diagram of generating a rule-set of non-overlapping rules in accordance with certain embodiments of the presently disclosed subject matter;

FIGS. 5a-5d illustrate schematic examples of covering the log records by a rule-set;

FIGS. 6a-6f schematically illustrate some operations of generating a rule-set in accordance with certain embodiments of the presently disclosed subject matter.

DETAILED DESCRIPTION OF EXEMPLARY EMBODIMENTS

Figure 1:
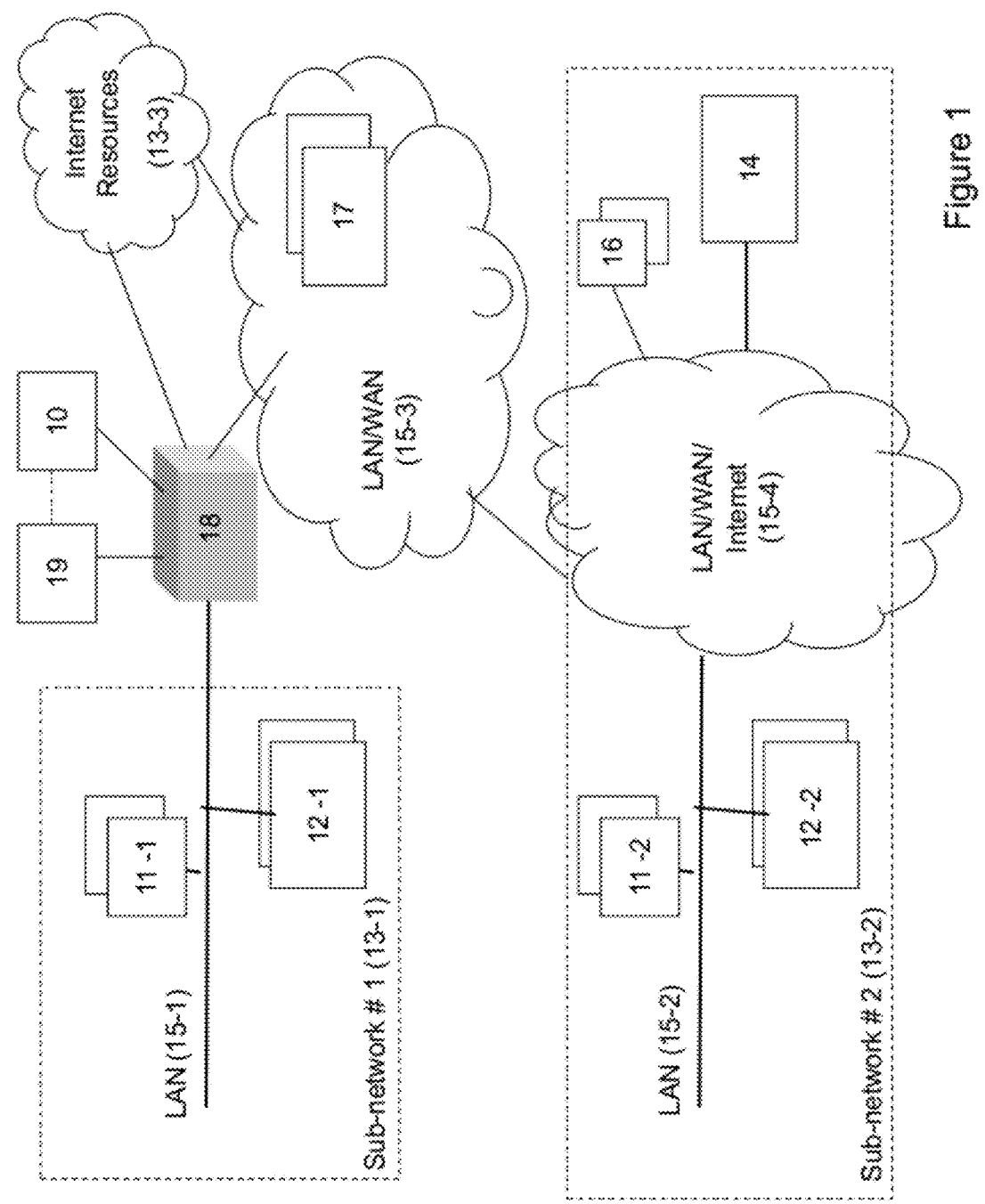
FIG. 1 illustrates a generalized network environment applicable to certain embodiments of the presently disclosed subject matter.

In the following detailed description, numerous specific details are set forth in order to provide a thorough understanding of the invention. However, it will be understood by those skilled in the art, that the presently disclosed subject matter can be practiced without these specific details. In other instances, well-known methods, procedures, components and circuits have not been described in detail so as not to obscure the presently disclosed subject matter. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "generating", "mapping", "removing", "finding", "adding", repeating", "dividing", "traversing" or the like, refer to the action and/or processes of a computer that manipulate and/or transform data represented as physical, such as electronic, quantities and/or data representing the physical objects.

The term "computer" should be expansively construed to cover any kind of electronic device with data processing capabilities. The operations in accordance with the teachings herein can be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages can be used to implement the teachings of the presently disclosed subject matters as described herein.

The term "configuring a security gateway" used in this patent specification should be expansively construed to include setting up a new rule-set for a new security gateway or existing security gateway, and/or replacing a pre-configured rule-set or parts thereof, and/or refining the pre-configured rule-set (e.g. for supporting newly added physical and/or logical resources and groups thereof, for on-going maintenance, etc.).

The term "a rule covering a log record" used in this patent specification should be expansively construed to include any rule with address space including source and destination addresses specified in the log record. Likewise, the term "a set of rules covering a group of log record" used in this patent specification should be expansively construed to include any set of rules characterized by address space including all source and destination addresses specified in the log records in the group.

The references cited in the background teach many principles of configuring a security gateway that are applicable to the presently disclosed subject matter. Therefore the full contents of these publications are incorporated by reference herein where appropriate for appropriate teachings of additional or alternative details, features and/or technical background.

Bearing the above in mind, attention is drawn to FIG. 1 schematically illustrating an exemplary data network implementing certain embodiments of the presently disclosed subject matter. The data network comprises a plurality of intranet network resources (e.g. workstations 11-1, 11-2, and/or servers 12-1, 12-2, web-based application server 14, resources associated with mobile users 16, etc.) grouped in sub-networks 13-1 and 13-2. The sub-networks, as well as the resources within the sub-networks, can be operatively coupled via one or more local (15-1, 15-2) or wide area (15-3, 15-4) communication networks (including Internet) or combinations thereof. The communication network comprises one or more communication devices 17 (e.g. switches, routers, bridges, etc.) facilitating data transfer and can be private, public or combined. One or more communication networks (typically, private communication networks) can constitute a part of the intranet. The intranet resources (including client-based resources, web-based resources, etc.) can be predefined as belonging to the intranet. The intranet resources can be grouped in two or more logical groups (sub-networks) in accordance with different criteria. For example, the grouping can be provided in accordance with network architecture (e.g. resources connected by certain LAN) and/or business structure (e.g. resources related to a certain business unit) and/or business function (e.g. resources related to a certain application/business task) and/or level of user's trust and/or level of classified information, etc.

The data network can include also resources, other than intranet, by way of non-limiting example, Internet resources (other than web-based intranet resources); these resources can be grouped, for example, in one or more sub-networks 13-3.

A security gateway 18 is operatively coupled to the sub-network 13-1 and controls inbound and outbound traffic related to the sub-network and resources thereof. Similar, the security gateway 18 or other (not shown) security gateway(s) can control inbound and outbound traffic related to sub-network 13-2 and/or parts thereof. The security gateway can comprise, for example, one or more firewalls or routers with respective load balancers, intrusion detection/prevention systems, VPN devices and/or other equipment that facilitates network and/or application security. The security gateway 18 operates in accordance with one or more rules related to control, at least, inbound and/or outbound traffic with regard to respective resources. These rules (including combinations and/or hierarchies thereof) are referred to hereinafter as a rule-set. A single rule typically includes several fields (e.g. source (IP address and/or port), destination (IP address and/or port), service type, user, application, etc.), a condition (including criterion and logic with regard to the field values) to be satisfied; and an action which shall be drawn from the rule when the condition is satisfied. The fields included in such conditions are referred to hereinafter as "fields engaged in the rules". The action in the rule can specify accepting or denying the respective traffic, authentication and encryption, etc. A field can be characterized by a value or a range of values, e.g. a range of TCP ports, a range of IP addresses in a LAN defined by a mask, etc.

Communication events, i.e. events related to inbound and/or outbound traffic controlled by the security gateway, can be logged. Log recording is triggered by matching a certain rule, while the format of the log record(s) is determined by the log configuration specified in the policy and/or respective rule. By way of non-limiting example, a log record associated with a rule comprises time and date of the recorded event, an identifier of the respective rule, event specification (e.g. the source and destination addresses of the access session, the name of service attempted, used protocol, source and designation ports, etc.), action taken, user, application, the security gateway that generated the log entry, etc. Log records can further comprise derivatives of information related to certain events (e.g. hit-count data). Log records can be accommodated in the security gateway and/or exported to other systems (e.g. security management block) via standard (e.g. syslog, SNMP, NetFlow etc.) or proprietary (e.g. OPSEC, etc.) protocols.

The security gateway 18 is operatively connected to a security management block 19. The security management block can be fully or partly integrated with the security gateway or can be implemented in one or more stand-alone servers or integrated with other network resources. The functions of the security management block can include providing a backend for the policy editor GUI, monitoring the operation of the security gateway, storing the rule-set database and log database, reporting, etc. In certain embodiments, the rule-set database and the log database (or respective parts thereof) can be accommodated in the security gateway and/or the management block.

In accordance with certain embodiments of the presently disclosed subject matter, the security gateway 18 and/or the security management block 19 are operatively connected to a rule generator 10 configured to generate an operational rule-set for configuring the security gateway as will be further detailed with reference to FIGS. 2-7. The rule generator can be fully or partly integrated with the security gateway and/or the security management block, or can be implemented in one or more stand-alone servers, or fully or partly integrated with other devices (including sub-network resources, communication devices, security devices, etc.).

Note that the presently disclosed subject matter is not bound by the specific architecture described with reference to FIG. 1. Those versed in the art will readily appreciate that the presently disclosed subject matter is, likewise, applicable to any network architecture facilitating protection of data network resources in accordance with a rule-set installed at any suitable security gateway capable of controlling the respective traffic. The teachings of the presently disclosed subject matter are applicable to any suitable security gateway enforcing a rule-set controlling respective traffic.

Figure 2:
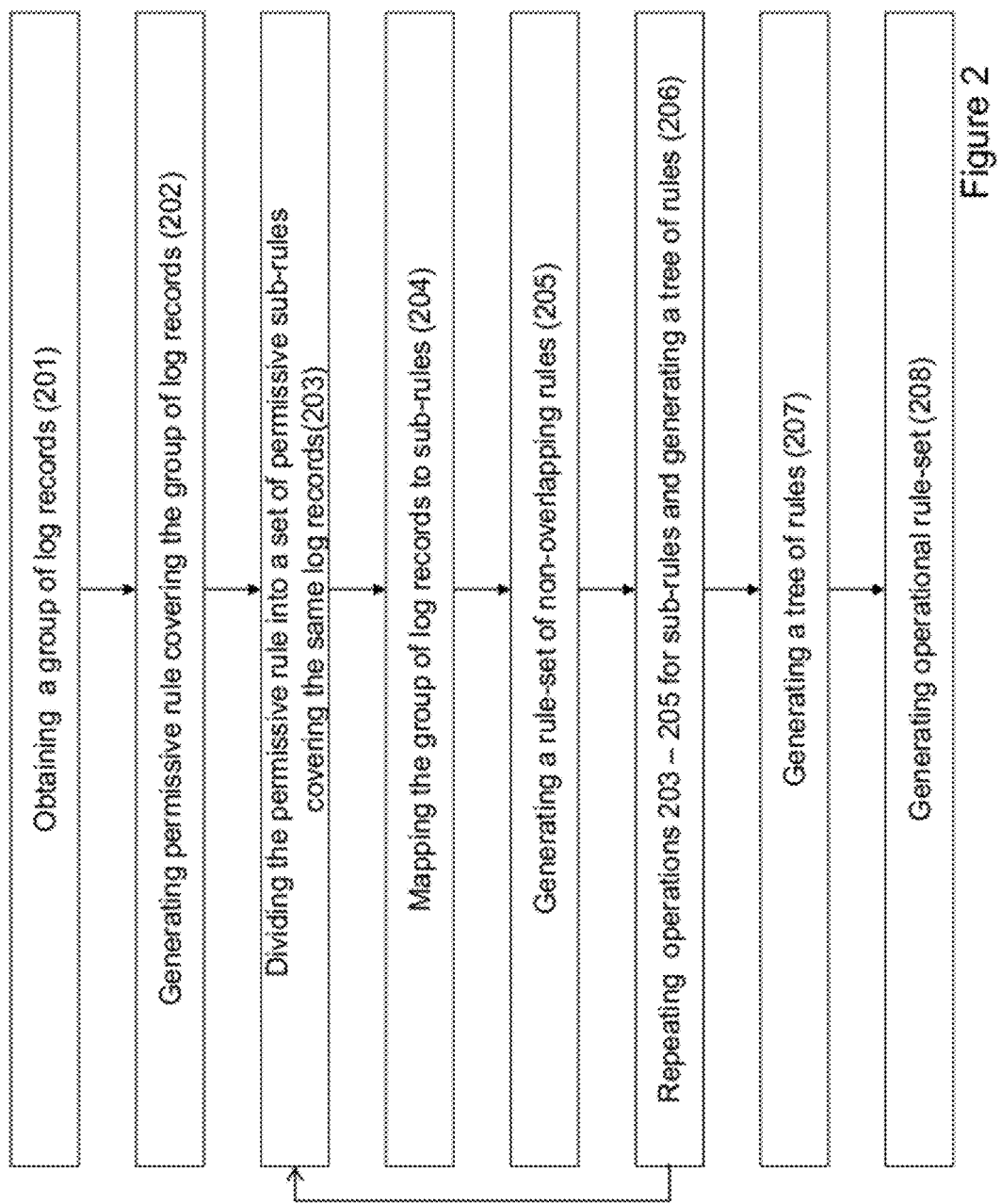
FIG. 2 illustrates a generalized flow diagram of generating an operational rule-set in accordance with certain embodiments of the presently disclosed subject matter.

Referring to FIG. 2, there is illustrated a generalized flow diagram of generating a security rule-set in accordance with certain embodiments of the presently disclosed subject matter.

The process starts with collecting (201) a group of log records. The term "group of log records" used in the specification should be expansively construed to include any collected log records grouped per one or more log fields (e.g. per one or more services, one or more ports, per user, application, etc.), and includes, also, a group constituted by all collected log records.

The collected group of log records can correspond to all traffic controlled (or to be controlled) by the security gateway or can be related to a subset of the traffic controlled (or to be controlled) by the security gateway. The log records are collected during a certain substantial period of time (e.g. 1 week, 1 month, etc.) and/or until obtaining a sufficient amount of data, and can be obtained by the rule generator 10 from the security gateway 18 and/or security management block 19. Additionally or alternatively, the rule generator 10 can be configured as a sniffer capable of monitoring and/or capturing inbound and/or outbound traffic with regard to resources of interest, to log respective communication events and to collect such log records during a certain substantial period of time and/or until obtaining a sufficient amount of data. Additionally or alternatively, the log records can be obtained by the rule generator from an external sniffer and/or external database.

The log records are collected (e.g. by the security gateway and/or by the security management block and/or by the rule generator) until obtaining a sufficient amount of log records characterized, for example, by predefined/configurable threshold(s), predefined collection period, etc. The duration of the collection period depends on intensity of traffic between involved network resources (e.g. one month can be a reasonable default value for many organizations). Accuracy of the resulting operational rule-set generated in accordance with the gathered information increases with increasing the number of collected logs (and, accordingly, the duration of the collection period). The duration of the collection period can be configurable in accordance with a certain threshold. The threshold can be characterized, for example, by a total number of collected respective logs (e.g. 5 million logs); by a number of logs collected per certain service and/or destination/source addresses; by a total number of collected respective logs of some types of traffic (especially for rare traffic, e.g. a backup restore service); by a total number of collected respective logs and relationship thereof of different types of traffic (e.g. 5% of certain traffic among not less than 1 million collected log records); by total number of collected logs in relation to traffic per pre-configured rule-set, etc.

The collecting period can be a period prior to the security gateway operation and/or during the operation (e.g. on an on-going basis for refining the rule-base, amending rules to reflect new connectivity requirements, etc.).

The rule generator further generates (202) an initial permissive rule that corresponds to an address space covering respective log records, such address space referred to hereinafter as a log-defined address space. Accordingly, the permissive rule can cover "Any Source", "Any Destination", wherein the source and destination addresses belong to the respective log-defined address space. Optionally, the initial permissive rule can be configured to cover only a selected subset of the collected log records, for example group of log records corresponding to selected service (and/or other log fields if used for grouping).

The rule generator further divides (203) the generated initial permissive rule and thus generates a set of permissive sub-rules covering the same log records as the divided rule. Optionally, the sub-rules can be characterized by equal size of respective address spaces. The rule generator further maps (204) the log records to the generated sub-rules and generates (205) a rule-set of non-overlapping rules covering all log records in the group.

Figure 3:
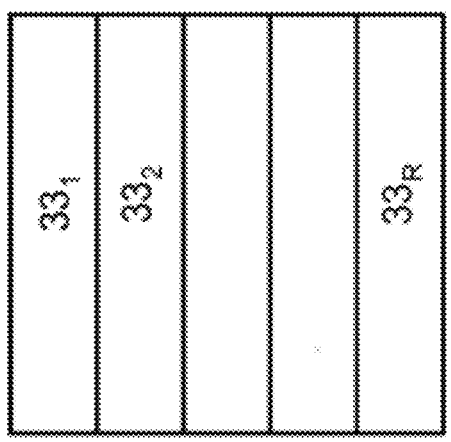
FIG. 3 illustrates a schematic example of dividing an initial permissive rule and generating a set of permissive sub-rules in accordance with certain embodiments of the presently disclosed subject matter.
Figure 3:
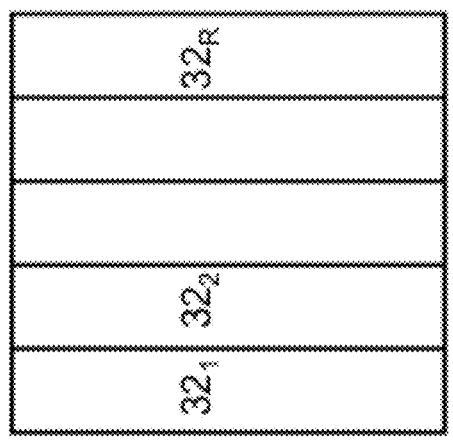
Figure 3:
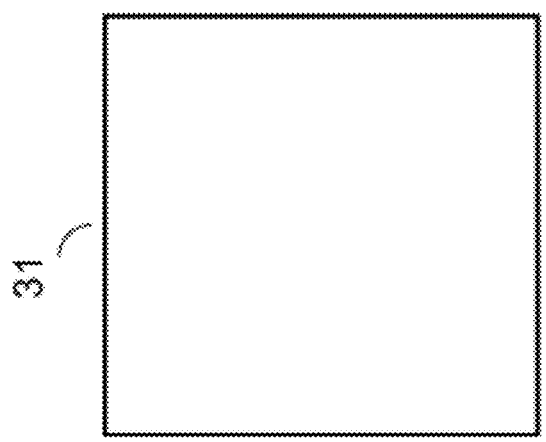

FIG. 3 schematically illustrates an example of dividing an initial permissive rule into a set of permissive sub-rules. As illustrated, an address space (31) corresponding to the initial permissive rule can be divided into 2R address spaces each having the same size and corresponding to the generated sub-rules. The first R address spaces ($32_1$-$32_R$) (and corresponding sub-rules) are generated by maintaining the full original source range and splitting the original destination range into R equal ranges. The next R address spaces ($33_1$-$33_R$) (and corresponding sub-rules) are generated by maintaining the full original destination range and splitting the original source range into R equal ranges.

Figure 4B:
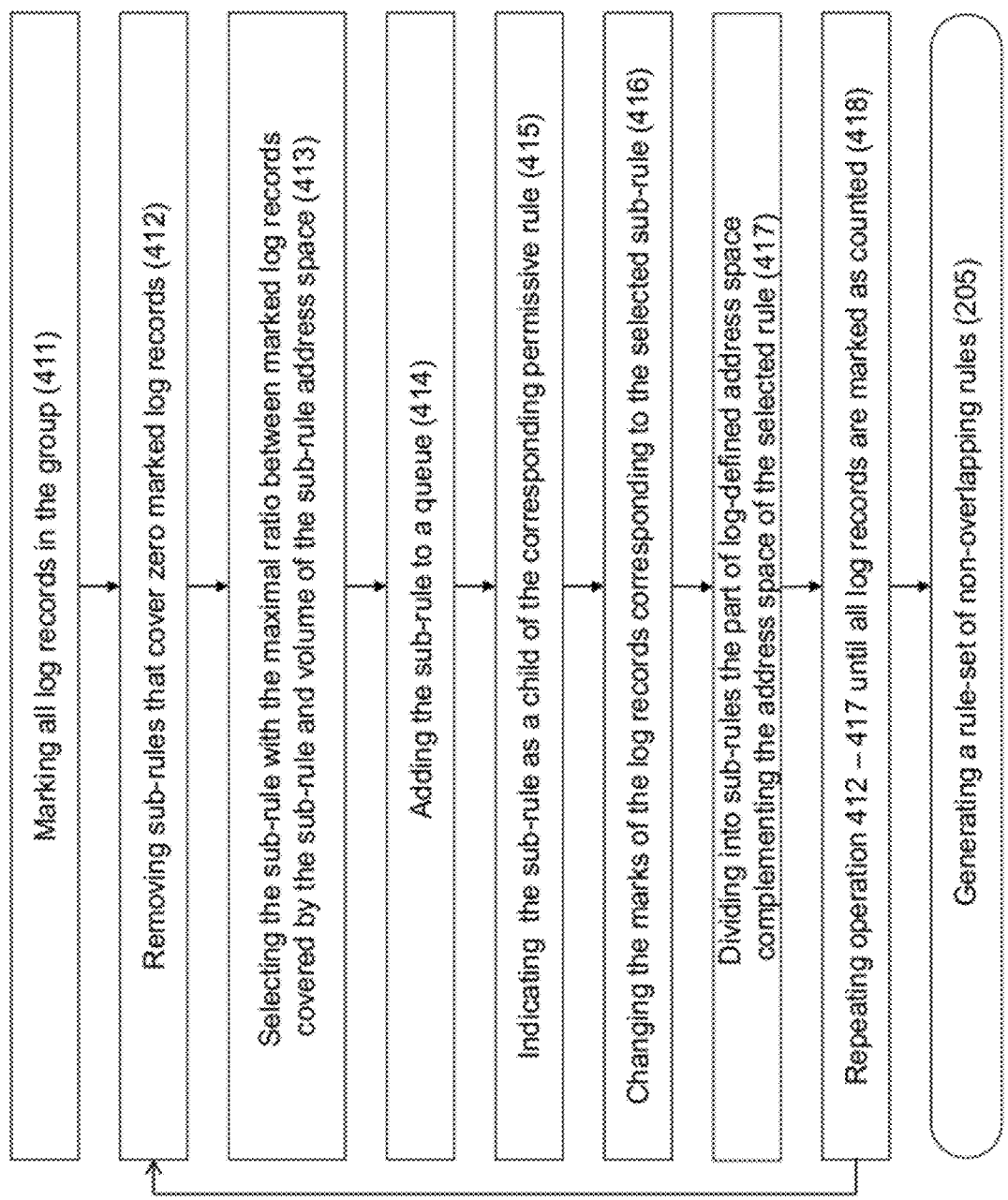
FIG. 4b illustrates a generalized flow diagram of generating a rule-set of non-overlapping rules in accordance with other certain embodiments of the presently disclosed subject matter.

The rule-set of non-overlapping rules covering all respective log records can be generated (205) as illustrated, by way of non-limiting examples, by the generalized flow diagrams in FIGS. 4a-4b. Upon dividing (203) the generated initial permissive rule into a set of permissive sub-rules covering the same log records as the divided rule and further mapping (204) the log records to the generated sub-rules, the rule generator, as illustrated in FIG. 4a, marks (401) all log records in the group (e.g. as 'not counted' log records), and removes (402) sub-rules that cover zero marked log records. The rule generator further selects (403), among direct child sub-rules of the same rule, a sub-rule with the maximal ratio between marked log records covered by the sub-rule and volume of the sub-rule address space (e.g. a sub-rule with the most covered marked log records in a case of equal-size sub-rules), adds (404) the sub-rule to rule-set, indicates (405) the sub-rule as a child of the corresponding divided permissive rule, and changes (406) the marks of the log records covered by the selected sub-rule (e.g. the log records can be marked as 'counted'). The rule generator further removes (407) the sub-rules overlapping with the selected sub-rule and repeats (408) the operations 403-407 until all log records are marked as counted.

As illustrated in FIG. 4b by way of another non-limiting example, the rule generator marks (411) all log records in the group (e.g. as 'not counted' log records), and removes (412) sub-rules that cover zero marked log records. The rule generator further selects (413), among direct child sub-rules of the same rule, a sub-rule with the maximal ratio between marked log records covered by the sub-rule and volume of the sub-rule address space (e.g. a sub-rule with the most covered marked log records in a case of equal-size sub-rules), adds (414) the sub-rule to rule-set, indicates (415) the sub-rule as a child of the corresponding divided permissive rule, and changes (416) the marks of the log records corresponding to the selected sub-rule (e.g. the log records can be marked as 'counted'). The rule generator further divides (417) into sub-rules the part of log-defined address space complementing the address space of the selected rule (thus preventing overlapping) such that the new sub-rules cover all non-counted log records, and repeats (418) the operations 412-417 for the new sub-rules until all log records are marked as counted.

Referring back to FIG. 2, upon generating (205) the rule-set of non-overlapping rules, the rule generator further processes the generated rule-set of non-overlapping rules, said processing including mapping the generated rule-set of non-overlapping rule to the obtained group of log records and, thus, generates (208) operational rule-set. Generation of operational rule-set can include recursively repeating (206) the operations 203-205 for each sub-rule in the non-overlapping rule-set generated at a previous recursion. The operations are repeated until the rules can no longer be divided (e.g. single source IP and single destination IP) and/or until matching another predefined criterion (e.g. generating a non-overlapping rule-set wherein each rule is characterized by a single subnet as the source and/or the single subnet as a destination). At each appropriate operation, some of the rules (e.g. rules that share the same source or the same destination) can be combined into a single rule. The rule generator can further generate (207) a tree structure representing the sub-rules obtained at each of recursions. Rules with combined sources/destinations can be inserted at interim levels in between respective levels of the tree. Optionally, the tree structure can be generated and further updated at any recursion of the operations 203-205. Each node (rule) in the tree is characterized by extra coverage (i.e. extra traffic allowable by the rule compared with the address space corresponding to the covered log records).

The rule generator further traverses the generated tree structure in order to generate (208) the operational rule-set covering all log records and, optionally, matching a pre-defined criterion (e.g. maximal number of rules and/or maximal extra coverage, etc.).

It is noted that a rule-set covering all records shall cover every leaf node in the tree structure, while a leaf node is covered by the rule-set if the node itself is in the set, or if one of its ancestors is in the set. It is also noted that extra coverage of child rules detailed with reference to FIG. 2 is typically less (and in some cases is equal) than extra coverage of respective parent rules.

Accordingly, a user can define a desired number of rules N, and the rule generator will traverse the tree in order to find the best combination of N rules that covers all logs and provides minimal extra-coverage of the resulting operational rule-set.

Alternatively or additionally, a user can specify the maximal extra coverage and the rule generator selects the smallest operational set of rules that matches this criterion. The user can further specify additional restrictions such as smallest/largest network allowed, different extra coverage requirements for different network zones, etc.

Optionally, the tree can be displayed in a graphical format and the user can open nodes, drill down and select the leaves for manually generating a desired rule-set. Optionally, each leaf can be provided with an indication of extra coverage of the respective sub-rule compared with log records covered by the rule.

In cases where operations 201-206 are provided to more than one group of records, the resulting operational rule-sets can be combined into one operational rule-set.

Figure 5D:
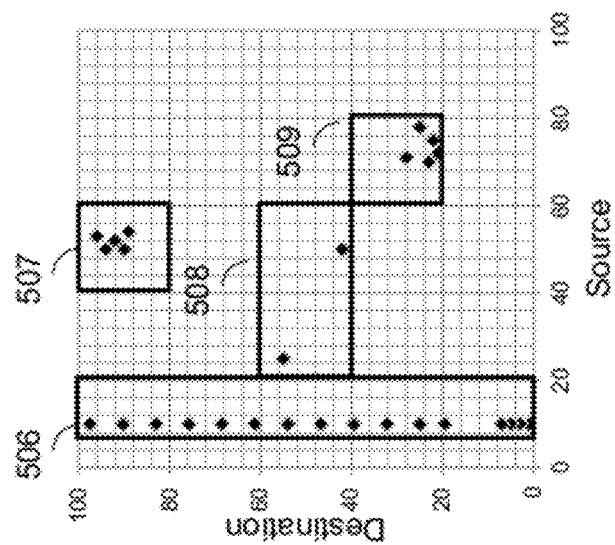
Figure 5C:
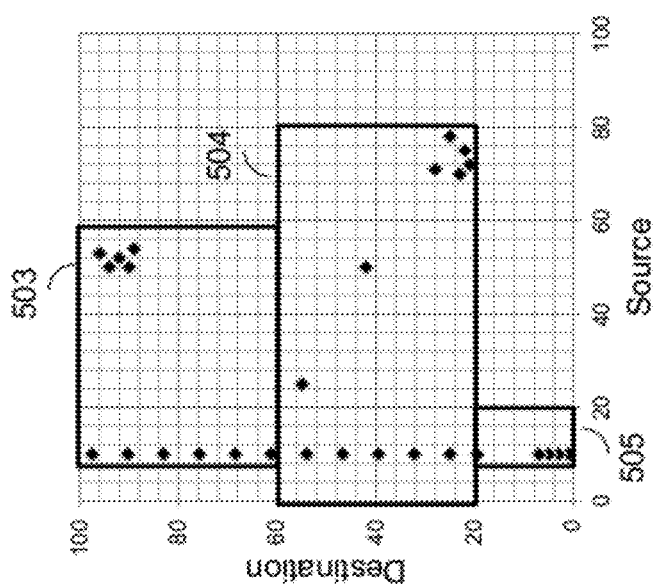

FIGS. 5a-5d schematically illustrate log records covered by a generated rule-set. FIG. 5a illustrates the log-defined address space, wherein source and destination addresses corresponding to the collected group of log records mapped onto a source-destination space are represented by the rectangle points. The rule-set covering these log records can be represented as a group of one or more rectangles, each rectangle representing a rule characterized by source and destination addresses corresponding to respective rule. FIGS. 5b-5d illustrate different exemplified options of covering the log records. The rule-set illustrated in FIG. 5b comprises two permissive rules corresponding to the rectangles 501-502, the rule-set illustrated in FIG. 5c comprises three permissive rules corresponding to the rectangles 503-505, and the rule-set illustrated in FIG. 5d comprises four permissive rules corresponding to the rectangles 506-509. Any of the illustrated options of the rule-sets (groups of rectangles) covers all log records. However, the rule-set illustrated in FIG. 5d provides less extra coverage (i.e. extra allowable traffic compared with the address space corresponding to log records) than other rule-sets, and the rule-set illustrated in FIG. 5b comprises less rules than other rule-sets. By way of non-limiting example, estimation of extra-coverage can be provided as detailed in US application US Patent Applications No. 2010/0299741 published Nov. 25, 2010 and No. 2011/060713 published Mar. 10, 2011, both applications assigned to the assignee of the present application and incorporated herewith by reference in their entirety.

FIGS. 6a-6f schematically illustrate some operations of the method of generation of the security rule-set detailed with reference to FIGS. 2, 4a and 4b.

Figure 6C:
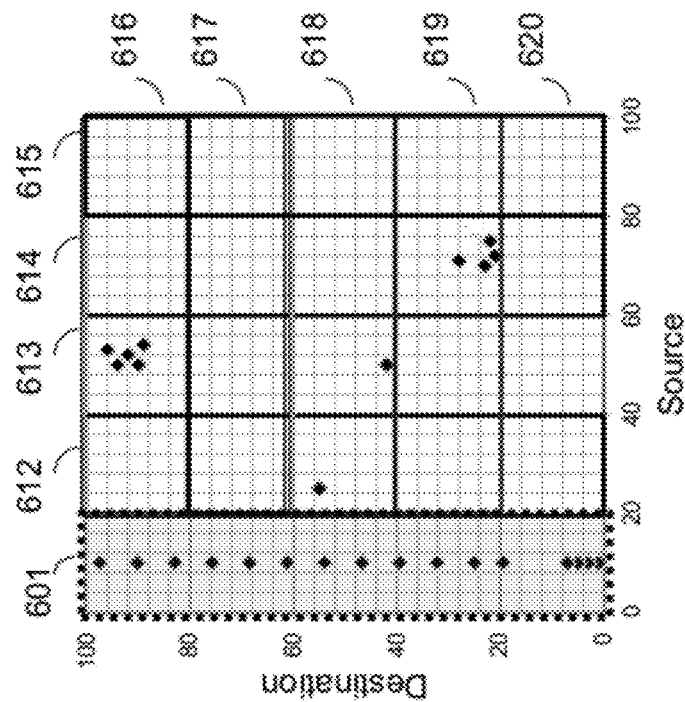
Figure 6B:
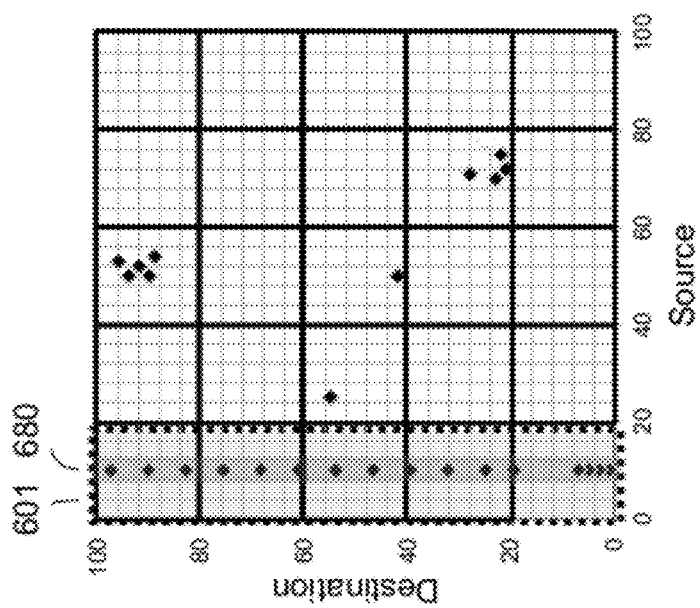
Figure 6E:
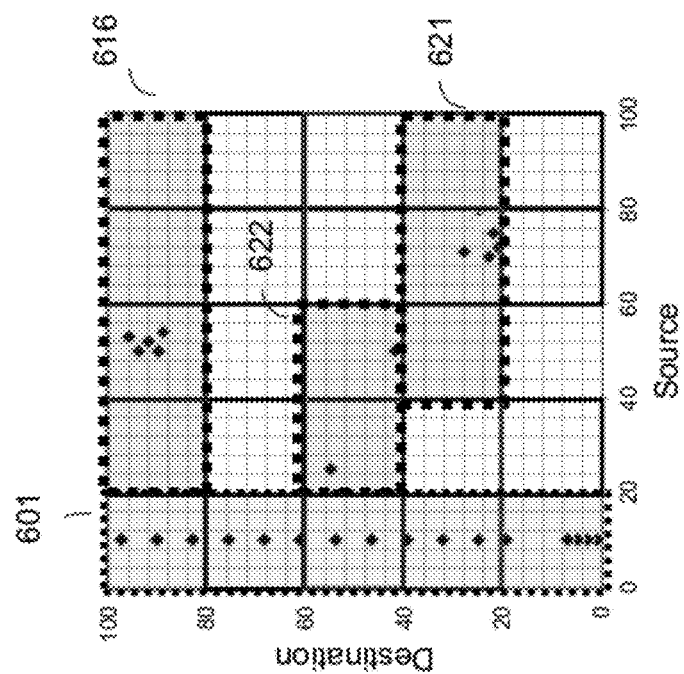
Figure 6D:
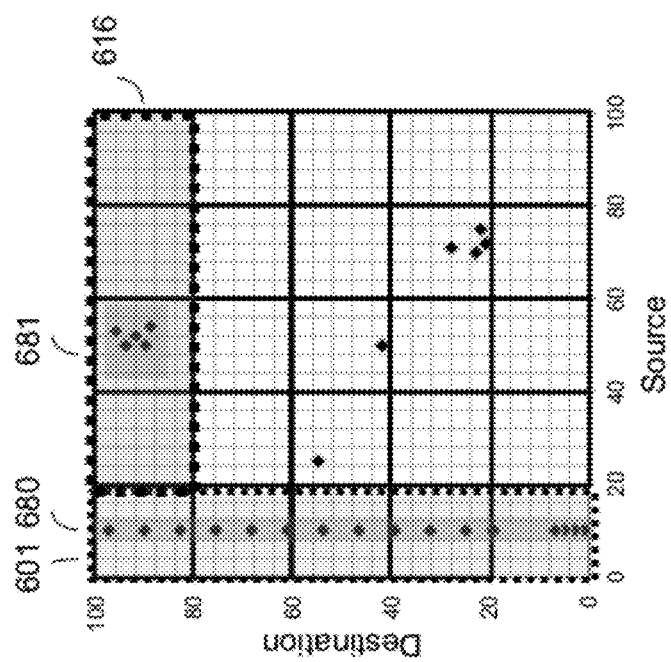

FIG. 6a illustrates operations 202 and 203 detailed with reference to FIG. 2. As illustrated, initial permissive rule 600 corresponding to the log-defined address-space is divided into ten sub-rules (R=5) 601-610 characterized by equal address spaces. FIG. 6b illustrates operation 403 and 406 detailed with reference to FIG. 4a (or, likewise, operation 413 and 416 detailed with reference to FIG. 4b). An illustrated selected sub-rule represented by dashed rectangle 601 contains maximal number of log records, and log records (680) covered by the sub-rule are marked as counted. FIG. 6c illustrates the part of log-defined address space complementing the address space of the selected rule divided into nine sub-rules 612-620 such that the new sub-rules cover all non-counted log records (operation 417). FIG. 6d illustrates operation 413 and 416 provided for sub-rules 612-620. An illustrated selected sub-rule represented by dashed rectangle 616 contains maximal number of log records, and log records (681) covered by this sub-rule are marked as counted. FIG. 6e illustrates the rule-set of four non-overlapping sub-rules (represented by dashed rectangles 601, 616, 621, 622) covering all log records and resulting from operations 411-418.

Figure 6F:
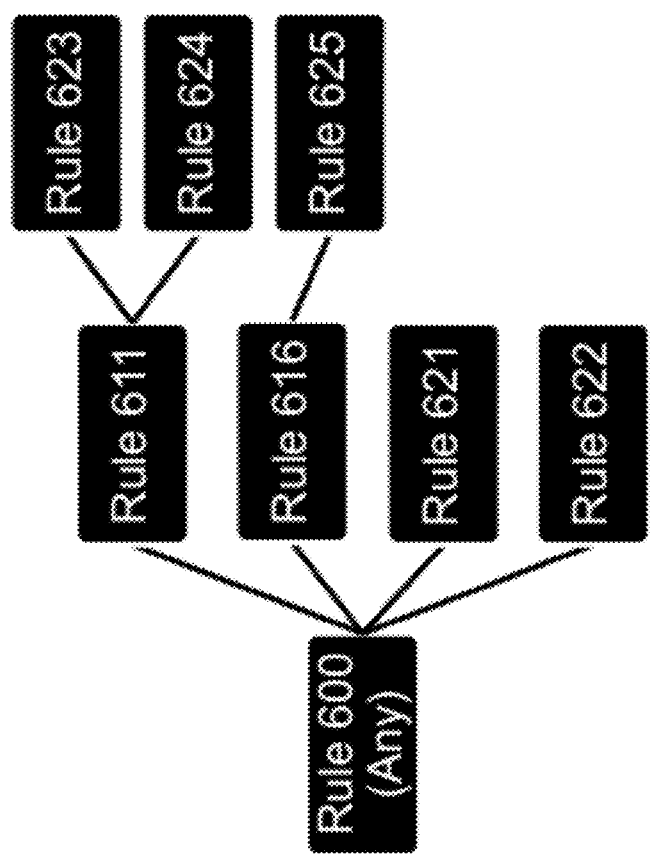

Each of the generated rules in the rule-set can be further divided into a set of permissive rules, and operations 205-206 (and, optionally, operations 401-408 or 411-418) are recursively repeated. The tree illustrated in FIG. 6f illustrates an exemplified result of such a recursive process. Each tree level represents a respective level of the recursion. Rule 600 corresponds to the log-defined address space, underneath sub-rules 611, 616, 621, 622 correspond to the sub-rules illustrated in FIG. 6e. Sub-rule 611 is further transformed into two child sub-rules 623 and 624 and sub-rule 616 is further transformed into child sub-rule 625 with less extra coverage than the parent sub-rule 616. Each of these rules can be divided again until eventually reaching a level in which no further division is possible.

Figure 7:
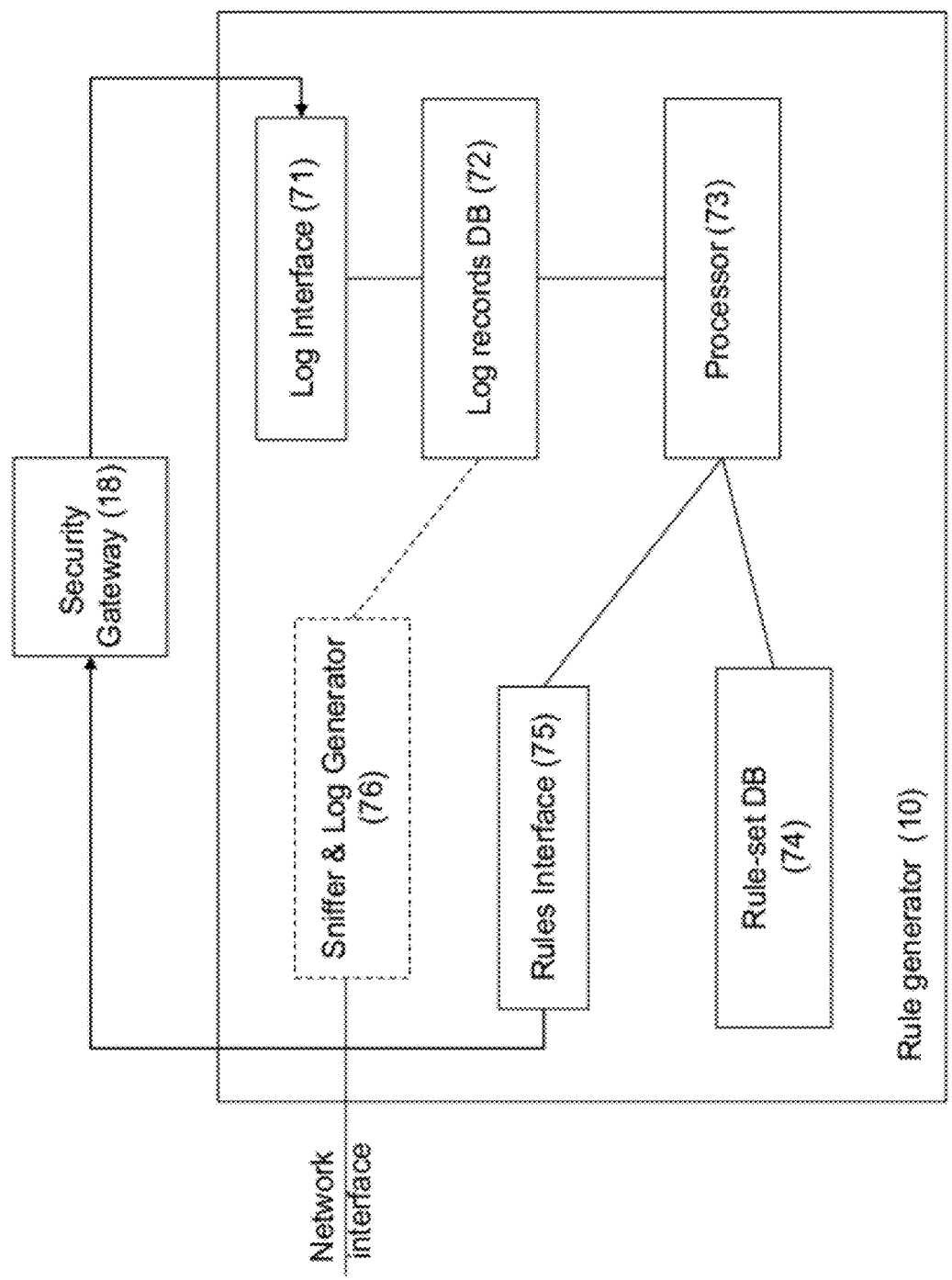
FIG. 7 illustrates a generalized functional block diagram of a rule-set generator in accordance with certain embodiments of the presently disclosed subject matter.

Referring to FIG. 7, there is illustrated a generalized block-diagram of the rule generator in accordance with certain embodiments of the presently disclosed subject matter. The rule generator (10) can be implemented as a standalone platform or integrated, fully or partly, with other network resources (e.g. firewall or other security gateway, security management module, sniffer, switch, etc.). The rule generator comprises a processor (73) operatively coupled to a log interface (71). The log interface is configured to obtain log records (e.g. generated by the security gateway) and to forward them to the processor and/or to a log records repository (72) operatively coupled to the processor. The processor 73 is configured to provide necessary processing of the obtained log records and to generate an operational rule-set in accordance with operations detailed with reference to FIGS. 2-6, to forward, if necessary, the obtained information and/or derivatives thereof for accommodation in one or more data repositories operatively coupled to the processor, and to provide necessary data management. The data repositories can include the log records repository (72), a rule-set DB (74), a best-practice repository (not shown) and others. The processor is further operatively coupled to a rules interface (75) configured to forward the generated rule set to the security gateway.

Optionally, the rule generator can comprise a sniffer (76) operatively coupled to the log DB and capable of monitoring and/or capturing the network traffic controlled (or to be controlled by the security gateway) and of generating respective log records as required in accordance with operation detailed with reference to FIGS. 2-6.

Those skilled in the art will readily appreciate that the presently disclosed subject matter is not bound by the configuration of FIG. 7; equivalent and/or modified functionality can be consolidated or divided in another manner and can be implemented in software, firmware, hardware, or any combination thereof. Those skilled in the art will also readily appreciate that the data repositories can be consolidated or divided in other manner; some of these databases can be shared with other systems or be provided by other systems, including 3rd party equipment.

It is to be understood that the presently disclosed subject matter is not limited in its application to the details set forth in the description contained herein or illustrated in the drawings. The presently disclosed subject matter is capable of other embodiments and of being practiced and carried out in various ways. It should be noted that the presently disclosed subject matter is not bound by the specific algorithm of processing or specific structure. Those versed in the art will readily appreciate that the presently disclosed subject matter is, likewise, applicable to any other processing or presentation to with equivalent and/or modified functionality that can be consolidated or divided in another manner.

It will also be understood that the presently disclosed subject matter further contemplates a machine-readable memory tangibly embodying a program of instructions executable by the machine for executing the method of the presently disclosed subject matter.

Those skilled in the art will readily appreciate that various modifications and changes can be applied to the embodiments of the presently disclosed subject matter as hereinbefore described without departing from its scope, defined in and by the appended claims.

The invention claimed is:

1. A method of generating a security rule-set using a computer comprising a processor operatively coupled to a memory, the method comprising:
 a) obtaining in the memory a group of log records of communication events resulting from traffic related to the security gateway;
 b) generating by the processor, a preliminary rule-set of permissive rules, said set covering the obtained group of log records;
 c) generating, by the processor and with the help of mapping the generated preliminary rule-set to the obtained group of log records, a rule-set of non-overlapping rules covering the obtained group of log records; and
 d) generating, by the processor, an operational rule-set by processing the generated rule-set of non-overlapping rules, said processing including mapping the generated rule-set of non-overlapping rule to the obtained group of log records,
wherein generating the operational rule-set comprises recursive dividing the rules in respective preliminary rule-set and generating a respective rule-set of non-overlapping rules until the generated rule-set of non-overlapping rules matches a predefined criterion.

2. The method of claim 1, wherein the obtained group of log records comprises amount of log records matching a predefined threshold.

3. The method of claim 1, wherein the obtained group of log records comprises all log records collected during a substantial collection period.

4. The method of claim 1, wherein the obtained group of log records comprises log records selected among collected log records, wherein the selection is provided in accordance with values specified in at least one field of the collected log records.

5. The method of claim 1 wherein traffic related to the security gateway is selected from a group comprising traffic controlled by the security gateway and traffic between source and destination addresses to be controlled by the security gateway.

6. A method of generating a security rule-set using a computer comprising a processor operatively coupled to a memory, the method comprising:
 a) obtaining in the memory a group of log records of communication events resulting from traffic related to the security gateway;
 b) generating by the processor, a preliminary rule-set of permissive rules, said set covering the obtained group of log records;

c) generating, by the processor and with the help of mapping the generated preliminary rule-set to the obtained group of log records, a rule-set of non-overlapping rules covering the obtained group of log records; and d) generating, by the processor, an operational rule-set by processing the generated rule-set of non-overlapping rules, said processing including mapping the generated rule-set of non-overlapping rule to the obtained group of log records, wherein generating the preliminary rule-set comprises defining an address space covering the obtained group of log records and generating 2R permissive rules, wherein each of R non-overlapping equal-size rules controls respective part of traffic resulting from dividing the destination range characterizing said defined address space into R parts whilst maintaining the source range of said address space, and wherein each of other R non-overlapping rules controls a respective part of traffic resulting from dividing the source range of said defined address space into R parts whilst maintaining the destination range of said address space, and wherein R is natural number R>1.

7. The method of claim 1 further comprising generating a tree structure representing at a respective level each of the recursive generated rule-sets of non-overlapping rules.

8. The method of claim 7 further comprising traversing the generated tree structure in order to generate the operational rule-set matching a predefined criterion selected from a group comprising criteria related, at least, to extra coverage and criteria related, at least, to a number of rules in the operational rule set.

9. The method of claim 1 wherein generating the rule-set of non-overlapping rules comprises:
a) marking by a certain mark all log records in the obtained group of log records;
b) selecting in preliminary rule-set a rule with the maximal ratio between number of covered log records marked by said certain mark and the volume of an address space of the respective rule;
c) adding the selected rule to the rule-set of non-overlapping rules;
d) removing said certain mark from the log records covered by said rule;
e) removing from preliminary rule-set all rules overlapping with the selected rule; and
f) repeating steps b)-e) until removing said certain mark from all log records in the obtained group of log records.

10. The method of claim 1 wherein generating the rule-set of non-overlapping rules comprises:
a) marking by a certain mark all log records in the obtained group of log records;
b) selecting in preliminary rule-set a rule with the maximal ratio between number of covered log records marked by said certain mark and the volume of the address space of the respective rule;
c) adding the selected rule to the rule-set of non-overlapping rules;
d) removing said certain mark from the log records covered by said rule;
e) generating a new preliminary rule-set covering remained log records marked by the certain mark and characterized by address space non-overlapping with the address space of the selected rule and
f) repeating steps b)-e) until removing said certain mark from all log records in the obtained group of log records.

11. A system capable of automated generation of a security rule-set, the system comprising:

an interface operable to obtain a group of log records of communication events resulting from traffic related to the security gateway;
a memory operatively coupled to the interface and operable to store the obtained group of log records; and
a processor operatively coupled to the memory and operable to:
generate a preliminary rule-set of permissive rules, said set covering the obtained group of log records;
generate, with the help of mapping the generated preliminary rule-set to the obtained group of log records, a rule-set of non-overlapping rules covering the obtained group of log records; and
generate an operational rule-set by processing the generated rule-set of non-overlapping rules, said processing including mapping the generated rule-set of non-overlapping rule to the obtained group of log records, wherein the generation of the operational rule-set comprises recursive dividing the rules in respective preliminary rule-set and generating a respective rule-set of non-overlapping rules until the generated rule-set of non-overlapping rules matches a predefined criterion, thus giving rise to the operational rule-set.

12. A system capable of automated generation of a security rule-set, the system comprising:
an interface operable to obtain a group of log records of communication events resulting from traffic related to the security gateway;
a memory operatively coupled to the interface and operable to store the obtained group of log records; and
a processor operatively coupled to the memory and operable to:
generate a preliminary rule-set of permissive rules, said set covering the obtained group of log records;
generate, with the help of mapping the generated preliminary rule-set to the obtained group of log records, a rule-set of non-overlapping rules covering the obtained group of log records; and
generate an operational rule-set by processing the generated rule-set of non-overlapping rules, said processing including mapping the generated rule-set of non-overlapping rule to the obtained group of log records, wherein the generation of the preliminary rule-set comprises defining an address space covering the obtained group of log records and generating 2R permissive rules, wherein each of R non-overlapping equal-size rules controls respective part of traffic resulting from dividing the destination range characterizing said defined address space into R parts whilst maintaining the source range of said address space, and wherein each of other R non-overlapping rules controls a respective part of traffic resulting from dividing the source range of said defined address space into R parts whilst maintaining the destination range of said address space, and wherein R is natural number R>1.

13. The system of claim 11 wherein the processor is further operable to generate a tree structure representing at a respective level each of the recursive generated rule-sets of non-overlapping rules.

14. The system of claim 13 wherein the processer is further operable to traverse the generated tree structure in order to generate the operational rule-set matching a predefined criterion selected from a group comprising criteria related, at least, to extra coverage and criteria related, at least, to a number of rules in the operational rule set.

15. The system of claim 11 wherein the generation of the rule-set of non-overlapping rules comprises:

a) marking by a certain mark all log records in the obtained group of log records;
b) selecting in preliminary rule-set a rule with the maximal ratio between number of covered log records marked by said certain mark and the volume of an address space of the respective rule;
c) adding the selected rule to the rule-set of non-overlapping rules;
d) removing said certain mark from the log records covered by said rule;
e) removing from preliminary rule-set all rules overlapping with the selected rule; and
f) repeating steps b)-e) until removing said certain mark from all log records in the obtained group of log records.

16. The system of claim 11 wherein the generation of the rule-set of non-overlapping rules comprises:
a) marking by a certain mark all log records in the obtained group of log records;
b) selecting in preliminary rule-set a rule with the maximal ratio between number of covered log records marked by said certain mark and the volume of an address space of the respective rule;
c) adding the selected rule to the rule-set of non-overlapping rules;
d) removing said certain mark from the log records covered by said rule;
e) generating a new preliminary rule-set covering remained log records marked by the certain mark and characterized by an address space non-overlapping with an address space of the selected rule; and
f) repeating steps b)-e) until removing said certain mark from all log records in the obtained group of log records.

17. The system of claim 11, wherein the obtained group of log records comprises log records selected among collected log records, wherein the selection is provided in accordance with values specified in at least one field of the collected log records.

18. A computer program product comprising a non-transitory computer useable medium having computer readable program code embodied therein for automated generation of a security rule-set, the computer program product comprising:
a) computer readable program code for enabling the computer to obtain a group of log records of communication events resulting from traffic related to the security gateway;
b) computer readable program code for enabling the computer to generate a preliminary rule-set of permissive rules, said set covering the obtained group of log records;
c) computer readable program code for enabling the computer to generate, with the help of mapping the generated preliminary rule-set to the obtained group of log records, a rule-set of non-overlapping rules covering the obtained group of log records; and
d) computer readable program code for enabling the computer to generate an operational rule-set by processing the generated rule-set of non-overlapping rules, said processing including mapping the generated rule-set of non-overlapping rule to the obtained group of log records,
wherein generating the operational rule-set comprises recursive dividing the rules in respective preliminary rule-set and generating a respective rule-set of non-overlapping rules until the generated rule-set of non-overlapping rules matches a predefined criterion.

* * * * *